United States Patent
Hirvonen et al.

(10) Patent No.: US 6,956,469 B2
(45) Date of Patent: Oct. 18, 2005

(54) METHOD AND APPARATUS FOR PEDESTRIAN DETECTION

(75) Inventors: David Hirvonen, Portland, OR (US); Theodore Armand Camus, Mount Laurel, NJ (US)

(73) Assignees: Sarnoff Corporation, Princeton, NJ (US); Ford Motor Company, Dearborn, MI (US)

( * ) Notice: Subject to any disclaimer, the term of this patent is extended or adjusted under 35 U.S.C. 154(b) by 0 days.

(21) Appl. No.: 10/819,870

(22) Filed: Apr. 7, 2004

(65) Prior Publication Data

US 2004/0258279 A1 Dec. 23, 2004

Related U.S. Application Data

(63) Continuation-in-part of application No. 10/461,699, filed on Jun. 13, 2003.
(60) Provisional application No. 60/484,464, filed on Jul. 2, 2003.

(51) Int. Cl.[7] .............................. B60Q 1/00; G06K 9/00

(52) U.S. Cl. .................... 340/435; 340/425.5; 340/903; 340/944; 382/103; 382/104; 382/209; 348/143; 348/148; 348/149

(58) Field of Search ................................ 340/903, 435, 340/436, 425.5, 937, 925, 961, 555, 565, 944; 382/103, 104, 123, 171, 209, 217, 154; 348/42, 47, 51, 77, 135, 143, 148, 149, 152; 250/330–334

(56) References Cited

U.S. PATENT DOCUMENTS

| | | | | | |
|---|---|---|---|---|---|
| 5,793,900 | A | * | 8/1998 | Nourbakhsh et al. | 382/263 |
| 6,052,124 | A | * | 4/2000 | Stein et al. | 345/419 |
| 6,396,535 | B1 | * | 5/2002 | Waters | 348/159 |
| 6,421,463 | B1 | * | 7/2002 | Poggio et al. | 382/224 |
| 2003/0231792 | A1 | * | 12/2003 | Zhang et al. | 382/154 |
| 2004/0075654 | A1 | * | 4/2004 | Hsiao et al. | 345/418 |

* cited by examiner

Primary Examiner—Donnie L. Crosland
(74) Attorney, Agent, or Firm—William J. Burke (57) ABSTRACT

A vehicle vision system that identifies pedestrians located proximate a vehicle. The system comprises a sensor array that produces imagery that is processed to generate disparity images. A depth map can be produced from the disparity images. Either the depth map or the disparity images are processed and compared to pedestrian templates. A pedestrian list is produced from the results of that comparison. The pedestrian list is processed to eliminate false pedestrians as determined by inverse eccentricity. The pedestrians are then tracked, and if a collision is possible, that information is provided to the driver and/or to an automated collision avoidance or damage or injury mitigation system.

40 Claims, 4 Drawing Sheets

METHOD AND APPARATUS FOR PEDESTRIAN DETECTION

CROSS-REFERENCE TO RELATED APPLICATIONS

This application claims the benefit of U.S. provisional patent application No. 60/484,464, filed Jul. 2, 2003, entitled, "Pedestrian Detection From Depth Images," by Hirvonen, et al., which is herein incorporated by reference.

This application is a continuation-in-part of pending U.S. patent application Ser. No. 10/461,699, filed on Jun. 13, 2003, entitled, "VEHICULAR VISION SYSTEM, by Camus et al. That patent application is hereby incorporated by reference in its entirety.

BACKGROUND OF THE INVENTION

1. Field of the Invention

The present invention relates to artificial or computer vision systems, e.g. vehicular vision systems. In particular, this invention relates to a method and apparatus for detecting pedestrians in a manner that facilitates collision avoidance.

2. Description of the Related Art

Collision avoidance systems utilize a sensor system for detecting objects in front of an automobile or other form of vehicle or platform. In general, a platform can be any of a wide range of bases, including a boat, a plane, an elevator, or even a stationary dock or floor. The sensor system may include radar, an infrared sensor, or another detector. In any event the sensor system generates a rudimentary image of the scene in front of the vehicle. By processing that imagery, objects can be detected. Collision avoidance systems generally identify when an object is in front of a vehicle, but usually do not classify the object or provide any information regarding the movement of the object.

Therefore, there is a need in the art for a method and apparatus that provides for pedestrian detection.

SUMMARY OF THE INVENTION

The principles of the present invention provide for a pedestrian detection system that detects pedestrians proximate a vehicle. The system includes an optical sensor array comprised of stereo cameras that produce imagery that is processed to detect pedestrians. Such processing includes generating a plurality of disparity images at different resolutions. Those disparity images can be selectively used to produce depth maps (or depth image) of the scene proximate the vehicle by processing selected disparity images. The result is depth maps having different resolutions. The disparity images and/or the depth maps are processed and compared to pre-rendered templates of pedestrians. A list of possible pedestrians is subsequently produced by matching the pre-rendered templates to the disparity images and/or to the depth map. The system processes the possible pedestrian list to detect pedestrians near the vehicle. Pedestrian detection includes eliminating very eccentric peaks in a correlation image while retaining all peaks with an inverse eccentricity above a predetermined value, e.g. >0.4. Inverse eccentricity is the ratio of the minor and major axes of an ellipse corresponding to all nearby high correlation scores for the detected peaks. This information can be used in a number of ways, e.g., the pedestrians may be displayed to the driver, a warning may be given, or the information may be used in a pedestrian avoidance system that adjusts the trajectory or other parameters of the vehicle to safely avoid the pedestrian or mitigate damage or injury.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
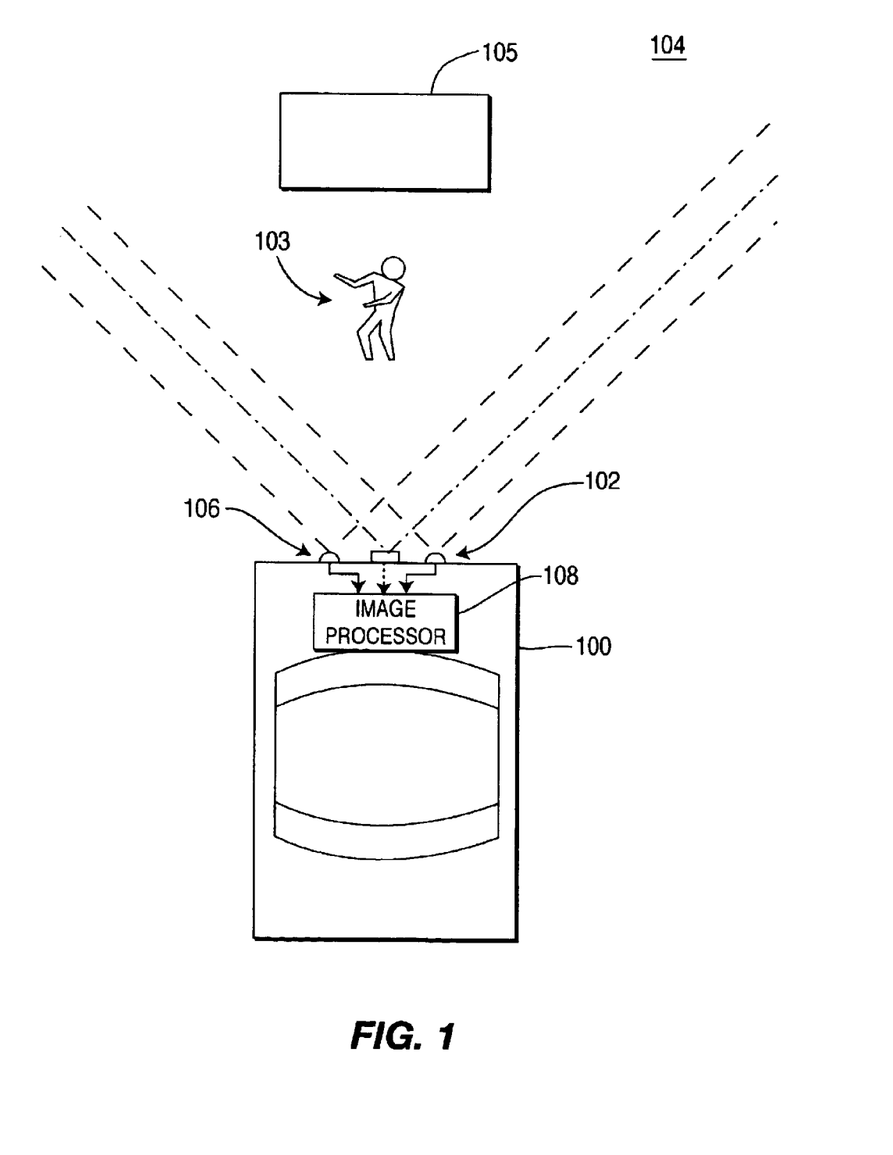
FIG. 1 depicts a schematic view of a vehicle utilizing the present invention.

FIG. 1 depicts a schematic diagram of a vehicle 100 having a pedestrian detection system 102 that detects a pedestrian (or pedestrians) 103 within a scene 104 that is proximate the vehicle 100. That scene may include another object, such as a target vehicle 105. While in the illustrated embodiment the scene 104 is in front of the vehicle 100, other pedestrian detection systems may image scenes that are behind or to the side of the vehicle 100. Furthermore, the pedestrian detection system 102 need not be related to a vehicle, but can be used with any type of platform, such as a boat, a plane, an elevator, or even stationary streets, docks, or floors. The pedestrian detection system 102 comprises a sensor array 106 that is coupled to an image processor 108. The sensors within the sensor array 106 have a field of view that includes one or more pedestrians 103 and possibly one or more target vehicles 105.

The field of view in a practical pedestrian detection system 102 may be ±12 meters horizontally in front of the vehicle 100 (e.g., approximately 3 traffic lanes), with a ±3 meter vertical area, and have a view depth of approximately 12 meters. When the pedestrian detection system 102 is part of a general collision avoidance system such as that taught in U.S. patent application Ser. No. 10/461,699, the overall view depth may be 40 meters or so. Therefore, it should be understood that the present invention can be used in a stand-alone pedestrian detection system or as part of a collision avoidance system.

Figure 2:
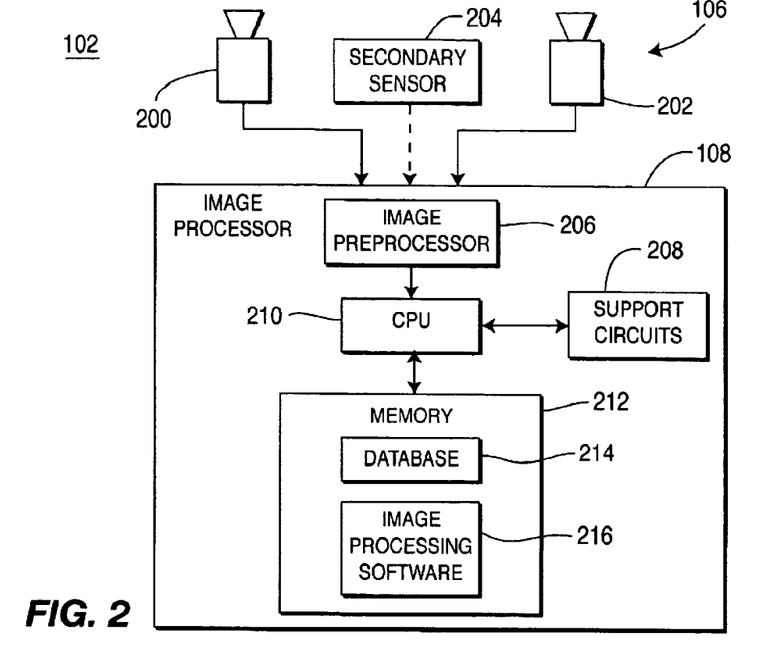
FIG. 2 depicts a block diagram of a vehicular vision system of the present invention.

FIG. 2 depicts a block diagram of hardware used to implement the pedestrian detection system 102. The sensor array 106 comprises, for example, a pair of cameras 200 and 202. In some applications an optional secondary sensor 204 can be included. The secondary sensor 204 may be radar, a light detection and ranging (LIDAR) sensor, an infrared range finder, a sound navigation and ranging (SONAR) senor, and the like. The cameras 200 and 202 generally operate in the visible wavelengths, but may be augmented with infrared sensors, or the cameras may themselves operate in the infrared range. The cameras have a known, fixed relation to one another such that they can produce a stereo image of the scene 104. Therefore, the cameras 200 and 202 will sometimes be referred to herein as stereo cameras.

Still referring to FIG. 2, the image processor 108 comprises an image preprocessor 206, a central processing unit (CPU) 210, support circuits 208, and memory 212. The image preprocessor 206 generally comprises circuitry for capturing, digitizing and processing the imagery from the sensor array 106. The image preprocessor may be a single chip video processor such as the processor manufactured under the model Acadia I™ by Pyramid Vision Technologies of Princeton, N.J.

The processed images from the image preprocessor 206 are coupled to the CPU 210. The CPU 210 may comprise any one of a number of presently available high speed microcontrollers or microprocessors. The CPU 210 is supported by support circuits 208 that are generally well known in the art. These circuits include cache, power supplies, clock circuits, input-output circuitry, and the like. The memory 212 is also coupled to the CPU 210. The memory 212 stores certain software routines that are retrieved from a storage medium, e.g., an optical disk, and the like, and that are executed by the CPU 210 to facilitate operation of the invention. The memory also stores certain databases 214 of information that are used by the invention, and image processing software 216 that is used to process the imagery from the sensor array 106. Although the invention is described in the context of a series of method steps, the method may be performed in hardware, software, or some combination of hardware and software. Additionally, the methods as disclosed can be stored on a computer readable medium.

Figure 3:
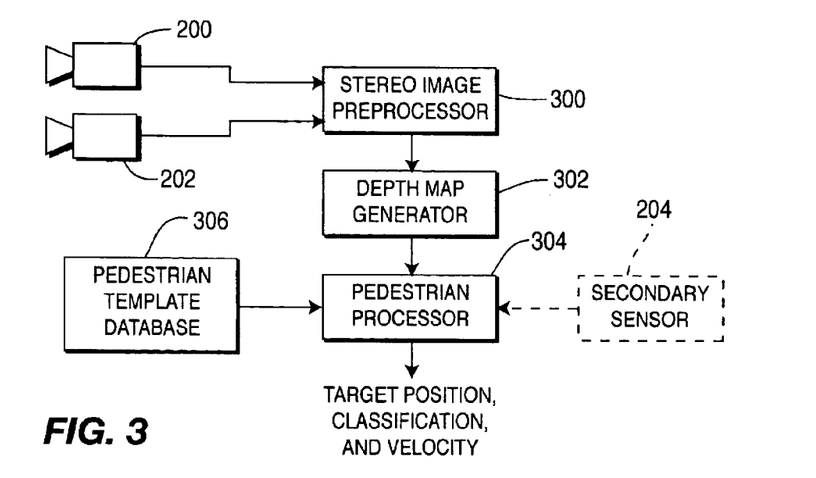
FIG. 3 depicts a block diagram of functional modules of the vision system of FIG. 2.

FIG. 3 is a functional block diagram of modules that are used to implement the present invention. The stereo cameras 200 and 202 provide stereo imagery to a stereo image preprocessor 300. The stereo image preprocessor is coupled to a depth map generator 302 which is coupled to a pedestrian processor 304. In some applications the depth map generator 302 is not used. However, the following will describe the functional block diagrams under the assumption that a depth map generator 302 is used. The pedestrian processor 304 receives information from a pedestrian template database 306 and from the optional secondary sensor 204. The stereo image preprocessor 300 calibrates the stereo cameras, captures and digitizes imagery, warps the images into alignment, performs pyramid wavelet decomposition, and performs stereo matching, which is generally well known in the art, to create disparity images at different resolutions.

The inventors have discovered that for both hardware and practical reasons that creating disparity images having different resolutions is beneficial when detecting objects such as pedestrians. Calibration is important as it provides for a reference point and direction from which all distances and angles are determined. Each of the disparity images contains the point-wise motion from the left image to the right image and each corresponds to a different image resolution. The greater the computed disparity of an imaged object, the closer the object is to the sensor array.

The depth map generator 302 processes the disparity images into two-dimensional depth images. Each depth image (also referred to as a depth map) contains image points or pixels in a two dimensional array, wherein each point represents a specific distance from the reference point to a point within the scene 104. The depth images are then processed by the pedestrian processor 304 wherein templates (models) of pedestrians are compared to the information within the depth image. In practice the depth map that is used for comparing with the pedestrian templates depends on the distance of the possible pedestrian from the reference point. At a given distance a depth map derived from disparity images at one resolution have been found superior when template matching than another depth map derived from disparity images at another resolution. The actually depth map to use in a particular situation will depend on the particular parameters of the pedestrian detection system 102, such as the cameras being used and their calibration. As described below, the pedestrian template database 306 comprises templates of pedestrians located at various positions and depths with respect to the sensor array 106 and its calibration information.

An exhaustive search of the pedestrian template database may be performed to identify a pedestrian template that closely matches information in a selected depth map. The secondary sensor 204 may provide additional information regarding the position of a pedestrian 103 relative to the vehicle 100 such that the pedestrian template search process can be limited to templates of pedestrian at about the known position relative to the vehicle 100. If the secondary sensor 204 is radar, the secondary sensor can, for example, provide an estimate of both pedestrian position and distance. Furthermore, the secondary sensor 204 can be used to confirm the presence of a pedestrian. The pedestrian processor 304 produces a pedestrian list that is then used to identify pedestrian size and classification estimates that enable pedestrian tracking of each pedestrian's position within the scene 104. That pedestrian information may then be used to warn the vehicle 100 driver and or with an automated system to avoid or mitigate damage and injury from pedestrian collisions.

Figure 4:
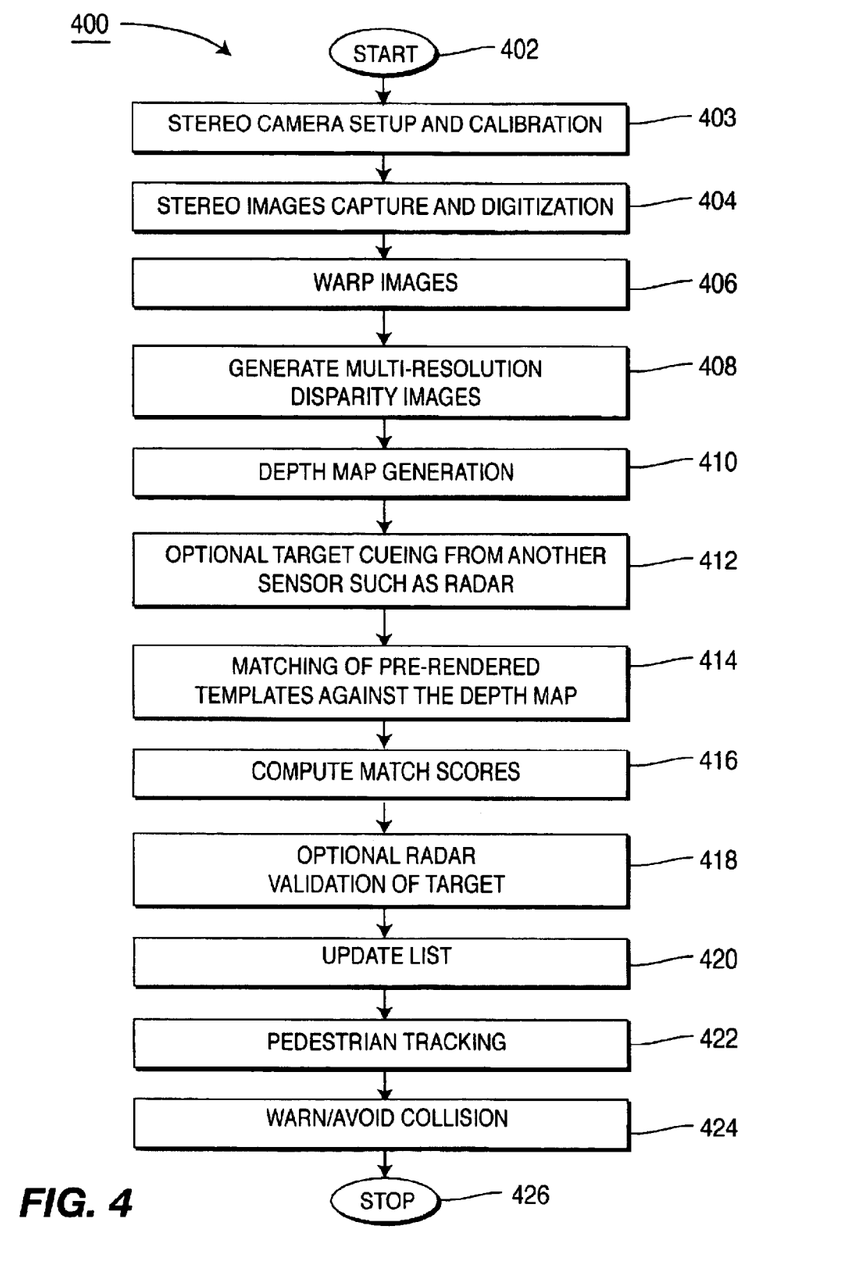
FIG. 4 depicts a flow diagram of the operation of a vision system of FIG. 2 that uses depth maps.

FIG. 4 depicts a flow diagram of a method 400 of operating the pedestrian detection system 102. The method 400 begins at step 402 and proceeds at step 403 with the setup and calibration of the stereo cameras 200 and 204. This is typically done only once per configuration. Calibration is used to provide various parameters such as a vehicle reference position, reference camera heights, stereo camera separation, and other reference data for the steps that follow. At step 404, images from the stereo cameras 200 and 202 are captured and digitized. At step 406, the imagery generated from each of the cameras is warped into alignment to facilitate producing disparity images. Warping is performed on the Acadia chips using the calibration parameters.

At step 408, the method 400 generates a plurality of disparity images from the stereo camera images using pyramid wavelet decomposition. Each disparity image corresponds to a different image resolution. Disparity image generation can be performed using an Acadia chip. The disparity images are created for each pair of frames generated by the stereo cameras. The disparity image comprises, in addition to the disparity information, an indication of which of the disparity pixels in the image are deemed valid or invalid. Certain disparity values may be deemed invalid because of image contrast anomalies, lighting anomalies and other factors. This valid/invalid distinction is used in processing the depth image as described below.

At step 410, the disparity images are used to produce a depth map. The depth map is produced using the calibration parameters determined in step 402 and a selected disparity map produced with a desired resolution. As previously noted when detecting pedestrians at a given distance from the vehicle a depth map derived from a disparity image at one resolution will work better than a depth map derived from a disparity map having a different resolution. This is because of hardware limitations that limit depth map generation and because of mathematical conversions when forming depth maps from the disparity images that produce depth map artifacts that show up as "noise" using one disparity image resolution but not with another resolution. As provided in the subsequently described method 500, the transformation to a depth map is not required. It does however, simplify subsequent computations. The depth map (also known as a depth image or range image) comprises a two-dimensional array of pixels, where each pixel has a value indicating the depth within the image at that pixel to a point in the scene from the sensor. As such, pixels belonging to objects in the image will have a depth to the object and all other pixels will have a depth to the horizon or to the roadway in front of the vehicle.

To confirm that an object, such as a pedestrian, exists in the field of view of the stereo cameras, at step 412 a secondary sensor signal is used for target cueing. This step is optional and may not be required in some systems. If the secondary sensor is radar, the secondary sensor produces an estimate of the range and position of an object. The purpose of this optional step is to restrict a subsequent depth map search (see step 414) so as to reduce the search space, and thus reduce the required calculations. As such, the pedestrian template matching process will require less time since the pedestrian template search will be restricted to areas at and near the radar-provided position and depth estimate. This step assists in preventing false targets by avoiding unnecessary searches.

Step 414 involves searching a pedestrian template database to match pedestrian templates to the depth map. The pedestrian template database comprises a plurality of pre-rendered pedestrian templates, e.g., depth models of various pedestrians as they would typically be computed by the stereo depth map generator 302. The depth image is a two-dimensional digital image, where each pixel expresses the depth of a visible point in the scene 104 with respect to a known reference coordinate system. As such, the mapping between pixels and corresponding scene points is known. In one embodiment, the pedestrian template database is populated with multiple pedestrian depth models, while the depth map is tessellated at ¼ meters by ¼ meters. Furthermore, a pedestrian height of around 1.85 meters can be used to distinguish pedestrians from shorter objects within the scene 104.

Step 414 employs a depth model based search, wherein the search is defined by a set of possible pedestrian location pose pairs. For each such pair, the hypothesized pedestrian 3-D model is rendered and compared with the observed scene range image via a similarity metric. This process creates an image with dimensionality equal to that of the search space, where each axis represents a pedestrian model parameter such as but not limited to lateral or longitudinal distance, and each pixel value expresses a relative measure of the likelihood that a pedestrian exists in the scene 104 within the specific parameters. Generally, at step 414 an exhaustive search is performed wherein a pedestrian template database is accessed and the pedestrian templates stored therein are matched to the depth map. However, if the optional target cueing of step 412 is performed the search space can be restricted to areas at or near objects verified by the secondary sensor. This reduces the computational complexity of having to search the complete scene 104.

Matching itself can be performed by determining a difference between each of the pixels in the depth image and each similarly positioned pixels in the pedestrian template. If the difference at each pixel is less than a predefined amount, the pixel is deemed a match.

At step 416, a match score is computed and assigned to corresponding pixels within a scores image where the value (score) is indicative of the probability that the pixel is indicative of a pedestrian. Regions of high density (peaks) in the scores image indicate a potential pedestrian 103 in the scene 104. Those regions (modes) are detected using a mean shift algorithm of appropriate scale. Each pixel is shifted to the centroid of its local neighborhood. This process is iterated until convergence for each pixel. All pixels converging to the same point are presumed to belong to the same mode, and modes that satisfy a minimum score and region of support criteria are then used to initialize the pedestrian detection hypotheses.

Pedestrian detection includes eliminating very eccentric peaks in a scores image while retaining all peaks with an inverse eccentricity greater than some predetermined value, e.g., >0.4. Here, inverse eccentricity is the ratio of the minor and major axes of an ellipse that corresponds to a nearby high correlation score for the detected peak. The effect is to restrict pedestrian detection to objects having a top-down view of a pedestrian, which tend to be somewhat round.

The match scores of step 416 can be derived in a number of ways. In one embodiment, the depth differences at each pixel between the template and the depth image are summed across the entire image and normalized by the total number of pixels in the pedestrian template. Without loss of generality, these summed depth differences may be inverted or negated to provide a measure of similarity. Spatial and/or temporal filtering of the match score values can be performed to produce new match scores.

In another embodiment, the comparison (difference) at each pixel can be used to determine a yes or no "vote" for that pixel (e.g., vote yes if the depth difference is less than one meter, otherwise vote no). The yes votes can be summed and normalized by the total number of pixels in the template to form a match score for the image.

In another embodiment, the top and bottom halves of the pedestrian template are compared to similarly positioned pixels in the depth map. If the difference at each pixel is less than a predefined amount, such as ¼ meter, the pixel is deemed a first match. The number of pixels deemed a first match is then summed and then divided by the total number of pixels in the first half of the pedestrian template to produce a first match score. Then, the difference of each of the pixels in the second half of the depth image and each similarly positioned pixel in the second half of the pedestrian template are determined. If the difference at each pixel is less than a predefined amount, the pixel is deemed a second match. The total number of pixels deemed a second match is then divided by the total number of pixels in the second half of the template to produce a second match score. The first match score and the second match score are then multiplied to determine a final match score.

At step 418 the optional secondary sensor, typically radar, is used to validate the pedestrian. As such, once a possible pedestrian is identified, the secondary sensor information is compared to the identified pedestrian to validate that the pedestrian 103 is truly in the scene 104. Such validation reduces the possibility of a false positive occurring. In some systems validation by both the stereo camera-based pedestrian detection system 102 and by a secondary sensor may be required. Then, based on the foregoing, at step 420 a pedestrian list is updated and at step 422 the pedestrians 103 are tracked. In some systems pedestrians 103 that do not track well can be eliminated as possible pedestrians (being false positives). At step 422, while tracking the pedestrians the original images from the stereo cameras may be used to identify the boundaries of pedestrians 103 within the scene 104. Further, each pedestrian is tracked across image frames such as by using a Kalman filter. Such tracking enables updating of the classification of the pedestrians 103 using multiple frames of information.

If a tracked pedestrian is determined to be in a position that could possibly involve a collision with the vehicle 100, at step 424 pedestrian information is provided to the driver and an alarm, or avoidance or damage or injury mitigation mechanism is initiated. Finally, the method 400 terminates at step 426.

In one embodiment, during the pedestrian template database of step 414 the processing speed can be increased by skipping ahead in larger increments of distance than typically used depending upon how poor the match score is. As such, normal distance increments of say ¼ of a meter could be changed to a larger step size, say ½ of a meter, but not one so large that a pedestrian 103 within the scene 104 could be missed. Thus, a modified exhaustive search may be utilized. When the modified exhaustive search is complete, method 400 continues to optional step 424.

Figure 5:
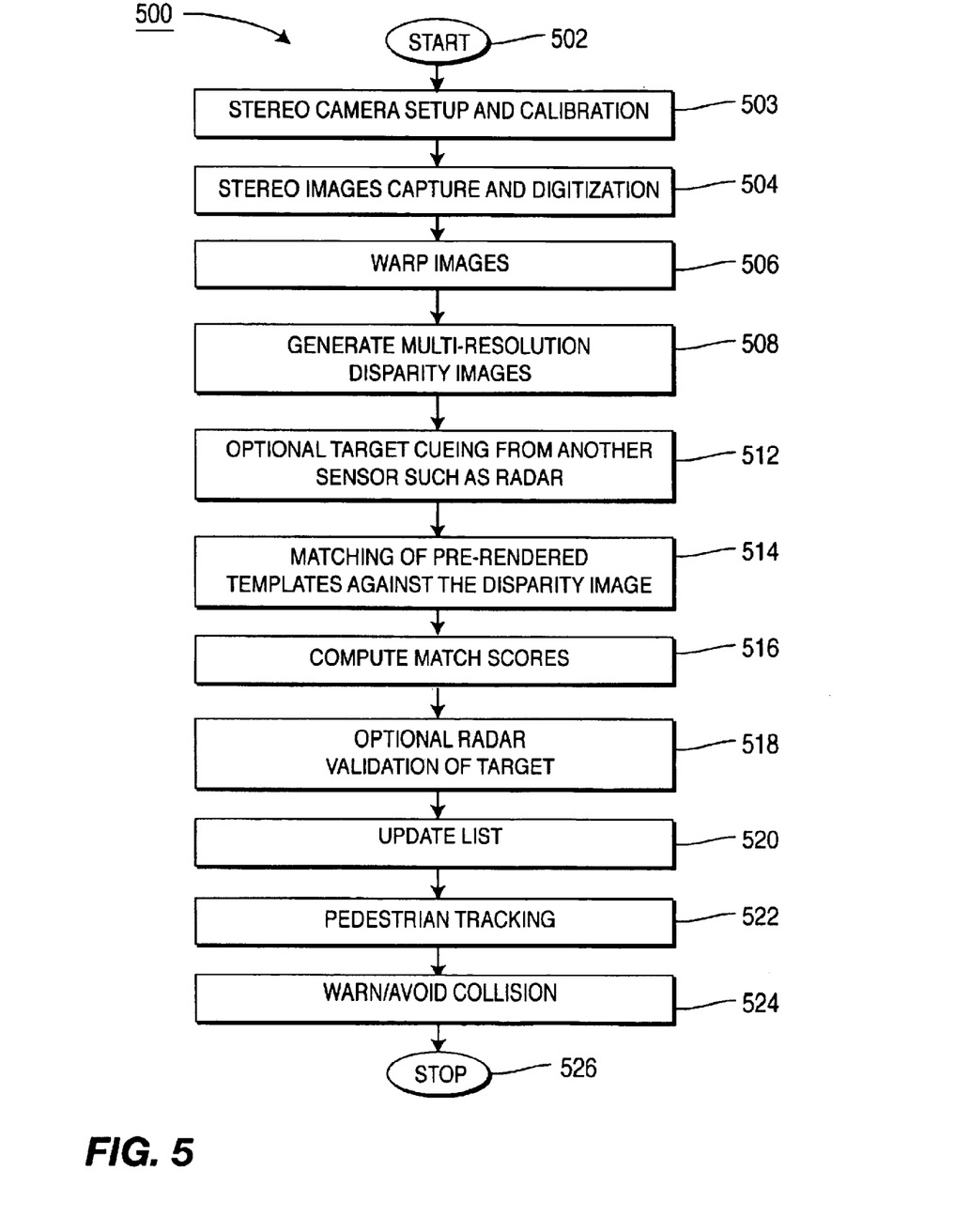
FIG. 5 depicts a flow diagram of the operation of a vision system of FIG. 2 that uses disparity images.

While the foregoing has described a system that uses a multi-resolution disparity image (or map) to produce a depth map at step 410, as previously noted this is not required. For example, FIG. 5 illustrates a method 500 that follows the method 400 except that a depth map is not produced. In fact, in the method 500, the steps 502, 503, 504, 506, and 508 are the same as steps 402, 403, 404, 406, and 408, respectively. However, in method 500 a disparity image produced at step 508 is not converted into a depth map (see step 408). The optional target cueing of step 512 is performed in the same way the optional target cueing of step 412. However, at step 514 the pedestrian templates are matched against the disparity image produce in step 508. Therefore, the pedestrian templates must be based on disparity images rather than on depth maps as in step 408. Then, the method 500 proceeds at step 516 by performing a match test to match the pedestrian templates to the multi-resolution disparity image. Then, the method 500 proceeds with steps 518, 520, 522, 524, and 526 that directly correspond to steps 418, 420, 422, 424, and 426 of method 400.

As previously noted pedestrian detection and collision detection can be performed together. If so, while performing vehicle detection a detected pedestrian can be masked out of the depth mask if the pedestrian is within a range of 0 to 12 meters. This prevents a pedestrian from contributing to double detection during a vehicle detection step. This is done because pedestrian templates detect pedestrians well at close range and will rarely detect a vehicle. Thus, at close range pedestrian detection is generally reliable. However, while masking greatly reduces the probability of a double-detection, double-detection is still possible, e.g. a pedestrian occludes a vehicle or a vehicle occludes a pedestrian and they are within 3 meters of each other and over 12 meters away. In some systems when a double detection occurs it is assumed that both detections relate to a vehicle. In such systems pedestrian detection is not possible more than 12 meters away unless a target yields a pedestrian but not a vehicle.

While the foregoing is directed to embodiments of the present invention, other and further embodiments of the invention may be devised without departing from the basic scope thereof, and the scope thereof is determined by the claims that follow.

What is claimed is:

1. A method of vision processing comprising:

producing a depth map of a scene proximate a vehicle;

comparing the depth map to a pedestrian template;

identifying a match between the depth map and the pedestrian template, wherein objects having inverse eccentricities less than a threshold are not identified as a match; and detecting the presence of a pedestrian.

2. The method of claim 1 further comprising:

imaging the scene with a stereo camera to produce stereo images; and processing the stereo images to produce the depth map.

3. The method of claim 1 wherein the comparing step further comprises:

differencing each of the pixels in the depth map and each similarly positioned pixel in the pedestrian template; and if the difference at each pixel is less than a predefined amount, the pixel is deemed a match.

4. The method of claim 3 wherein the identifying step comprises:

summing the number of pixels deemed a match and dividing the sum by a total number of pixels in the pedestrian template to produce a match score;

spatially and/or temporally filtering the match score values to produce a new match score; and if the match score is greater than a predefined match score amount, the pedestrian template is deemed a match.

5. The method of claim 1 wherein the comparing step further comprises:

dividing the depth map and pedestrian template into a first half and a second half;

differencing each of the pixels in the first half of the depth map and each similarly positioned pixel in the first half of the pedestrian template;

if the difference at each pixel is less than a predefined amount, the pixel is deemed a first match;

summing numbers of pixels deemed a first match and dividing the sum by a total number of pixels in the first half of the pedestrian template to produce a first match score differencing each of the pixels in the second half of the depth map and each similarly positioned pixel in the second half of the pedestrian template;

if the difference at each pixel is less than a predefined amount, the pixel is deemed a second match;

summing numbers of pixels deemed a second match and dividing the sum by a total number of pixels in the second half of the pedestrian template to produce a second match score;

multiplying the first match score with the second match score to determine a final match score;

if the final match score is greater than a predefined match score amount, the pedestrian template is deemed a match.

6. The method of claim 1 further comprising:

accessing at least one pedestrian template from a database comprising a plurality of pedestrian templates.

7. The method of claim 6 wherein the plurality of pedestrian templates represent pedestrians at varying positions and poses relative to the vehicle.

8. The method of claim 7 further including tracking a pedestrian across image frames.

9. The method of claim 1 further comprising:

receiving information regarding at least one pedestrian within the scene from a secondary sensor; and using the information to limit a number of pedestrian templates that are compared to the depth map.

10. The method of claim 9 wherein the secondary sensor is at least one sensor selected from a group comprising a radar sensor, an active infrared sensor, a LIDAR sensor, or a SONAR sensor.

11. The method of claim 1 further comprising:

receiving information regarding at least one pedestrian within the scene from a secondary sensor; and using the information to validate the match.

12. The method of claim 11 wherein the secondary sensor is at least one sensor selected from a group comprising a radar sensor, an active infrared sensor, a LIDAR sensor, or a SONAR sensor.

13. The method of claim 1 further comprising:

tracking the pedestrian across a plurality of frames to determine the position and velocity and direction of the pedestrian.

14. The method of claim 1 wherein adjusting a parameter of a vehicle includes warning of an impending collision with a pedestrian.

15. The method of claim 1 wherein the threshold is 0.4.

16. The method of claim 1 further including adjusting a parameter of a vehicle in response to the match of a pedestrian template.

17. A method of vision processing comprising:

producing a multi-resolution disparity image of a scene proximate a vehicle;

comparing the multi-resolution disparity image to a pedestrian template;

identifying a match between the multi-resolution disparity image and the pedestrian template, wherein objects having inverse eccentricities less than a threshold are not identified as a match; and detecting the presence of a pedestrian.

18. The method of claim 17 further comprising:

imaging the scene with a stereo camera to produce stereo images; and processing the stereo images to produce the multi-resolution disparity image.

19. The method of claim 17 wherein the comparing step further comprises:

differencing each of the pixels in the multi-resolution disparity image and each similarly positioned pixel in the pedestrian template; and if the difference at each pixel is less than a predefined amount, the pixel is deemed a match.

20. The method of claim 17 wherein the identifying step comprises:

summing the number of pixels deemed a match and dividing the sum by a total number of pixels in the pedestrian template to produce a match score;

spatially and/or temporally filtering the match score values to produce a new match score; and if the match score is greater than a predefined match score amount, the pedestrian template is deemed a match.

21. The method of claim 17 wherein the comparing step further comprises:

dividing the multi-resolution disparity image and pedestrian template into a first half and a second half;

differencing each of the pixels in the first half of the multi-resolution disparity image and each similarly positioned pixel in the first half of the pedestrian template;

if the difference at each pixel is less than a predefined amount, the pixel is deemed a first match;

summing numbers of pixels deemed a first match and dividing the sum by a total number of pixels in the first half of the pedestrian template to produce a first match score differencing each of the pixels in the second half of the multi-resolution disparity image and each similarly positioned pixel in the second half of the pedestrian template;

if the difference at each pixel is less than a predefined amount, the pixel is deemed a second match;

summing numbers of pixels deemed a second match and dividing the sum by a total number of pixels in the second half of the pedestrian template to produce a second match score;

multiplying the first match score with the second match score to determine a final match score;

if the final match score is greater than a predefined match score amount, the pedestrian template is deemed a match.

22. The method of claim 17 further including accessing at least one pedestrian template from a database comprising a plurality of pedestrian templates.

23. The method of claim 22 wherein the plurality of pedestrian templates represent pedestrians at varying positions and poses relative to the vehicle.

24. The method of claim 23 further including tracking a pedestrian across image frames.

25. The method of claim 17 further comprising:

receiving information regarding at least one pedestrian within the scene from a secondary sensor; and using the information to limit a number of pedestrian templates that are compared to the multi-resolution disparity image.

26. The method of claim 25 wherein the secondary sensor is at least one sensor selected from a group comprising a radar sensor, an active infrared sensor, a LIDAR sensor, or a SONAR sensor.

27. The method of claim 17 further comprising:

receiving information regarding at least one pedestrian within the scene from a secondary sensor; and using the information to validate the match.

28. The method of claim 27 wherein the secondary sensor is at least one sensor selected from a group comprising a radar sensor, an active infrared sensor, a LIDAR sensor, or a SONAR sensor.

29. The method of claim 17 further including tracking the pedestrian across a plurality of multi-resolution disparity image to determine the position and velocity of the pedestrian.

30. The method of claim 17 wherein the threshold is 0.4.

31. The method of claim 17 further including adjusting a parameter of a vehicle in response to the match of a pedestrian template.

32. The method of claim 31 wherein adjusting a parameter of a vehicle includes warning of an impending collision with a pedestrian.

33. Apparatus for performing vision processing comprising:

a stereo image preprocessor for producing a multi-resolution disparity image;

a depth map generator for processing the multi-resolution disparity image to form a depth map; and a target processor for comparing the depth map to a plurality of pedestrian templates to identify a match between at least one pedestrian template within the plurality of pedestrian templates and the depth map, wherein the target processor does not identify objects having inverse eccentricities less than a threshold.

34. The apparatus of claim 33 further including a secondary sensor that provides information regarding objects in the scene.

35. The apparatus of claim 34 wherein the secondary sensor comprises at least one sensor selected from a group comprising a radar sensor, an active infrared sensor, a LIDAR sensor, or a SONAR sensor.

36. A pedestrian detection system comprising:

a platform;

a stereo camera pair attached to said platform;

a stereo image preprocessor for producing a multi-resolution disparity image from said stereo camera pair;

a depth map generator for processing the multi-resolution disparity image disparity image to form a depth map; and a pedestrian processor having a pedestrian template database, said pedestrian processor for comparing the depth map to a plurality of pedestrian templates in said pedestrian template database to identify a match between at least one pedestrian template and the depth map, wherein the pedestrian processor does not identify objects having inverse eccentricities less than a threshold as a pedestrian.

37. A pedestrian detection system comprising:

a vehicle;

a stereo camera pair attached to said vehicle;

a stereo image preprocessor for producing a multi-resolution disparity image from said stereo camera pair; and a pedestrian processor having a pedestrian template database, said pedestrian processor for comparing the multi-resolution disparity image to a plurality of pedestrian templates in said pedestrian template database to identify a match between at least one pedestrian template and the multi-resolution disparity image, wherein the pedestrian processor does not identify objects having inverse eccentricities less than 0.4 as a match as a pedestrian.

38. A computer readable medium for storing a computer program that directs a computer to:

produce a depth map of a scene proximate a platform;

compare the depth map to a pedestrian template;

identify a match between the depth map and the pedestrian template, wherein objects having inverse eccentricities less than a threshold are not identified as a match; and detect the presence of a pedestrian.

39. A computer readable medium according to claim 38 wherein the map is a depth map.

40. A computer readable medium according to claim 38 wherein the map is a disparity map.

* * * * *